Dec. 28, 1943.  E. D. RANEY  2,337,926

CONTROL APPARATUS

Filed Oct. 21, 1939  4 Sheets-Sheet 1

INVENTOR
Eldon D. Raney
BY
ATTORNEY

Dec. 28, 1943.                E. D. RANEY                2,337,926
                            CONTROL APPARATUS
                          Filed Oct. 21, 1939        4 Sheets-Sheet 2
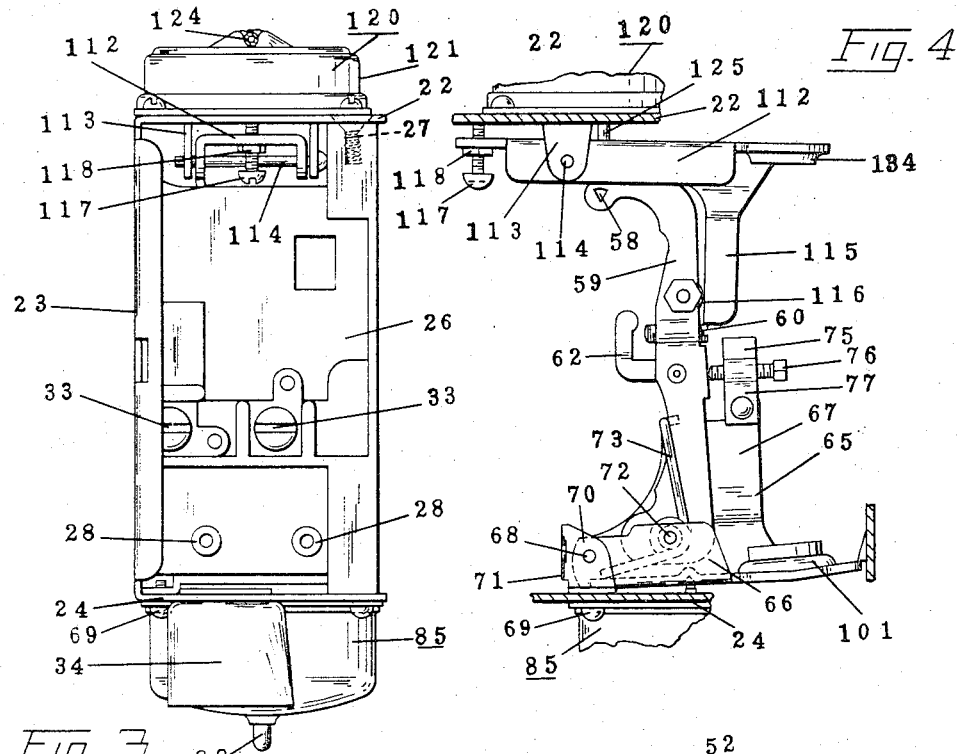
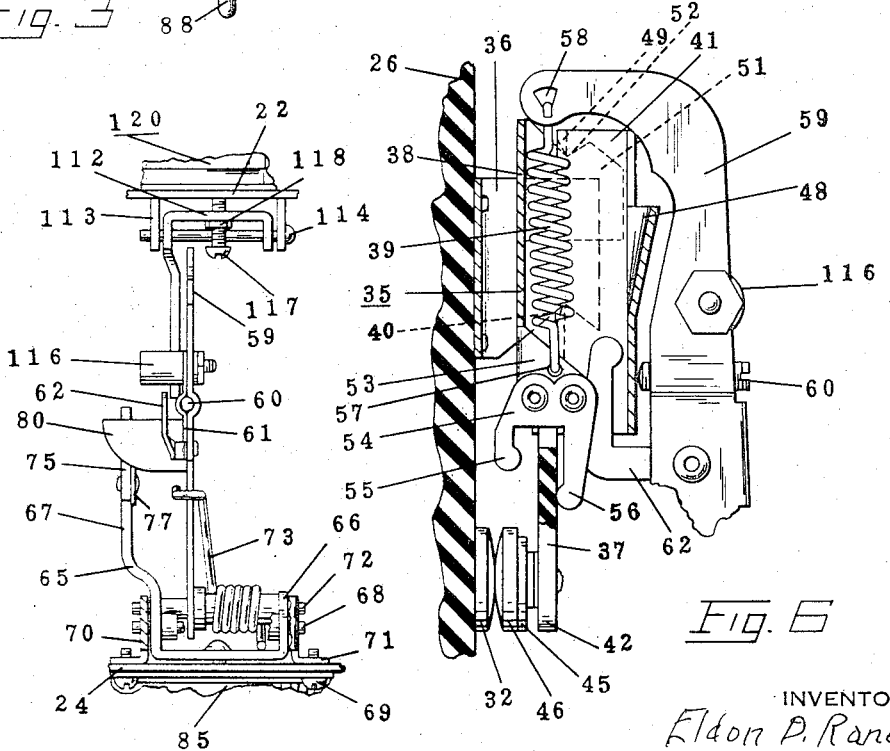
INVENTOR
Eldon D. Raney
BY
Warren H. F. Schmidt
              ATTORNEY Dec. 28, 1943.   E. D. RANEY   2,337,926
CONTROL APPARATUS
Filed Oct. 21, 1939   4 Sheets-Sheet 3
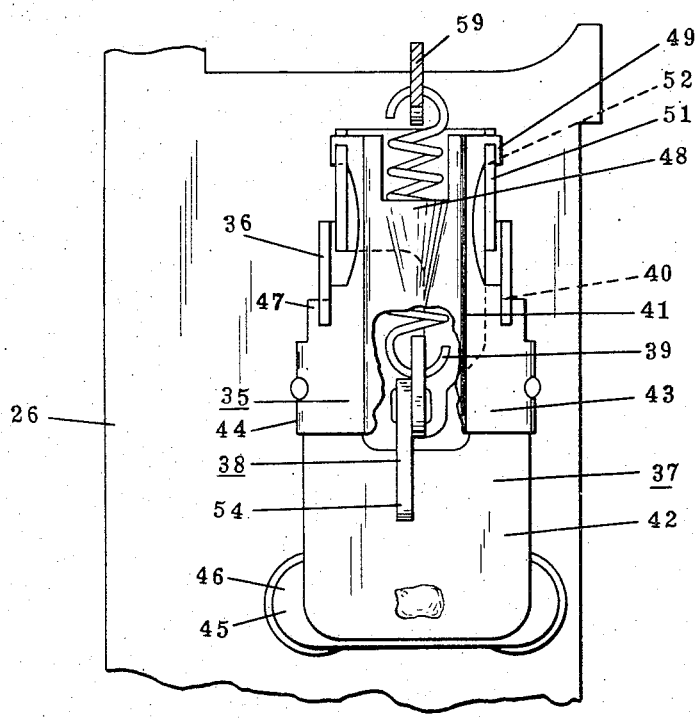
Fig. 7
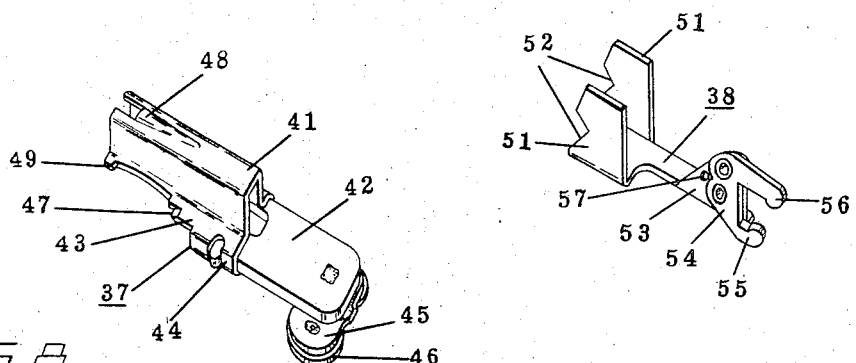
Fig. 8
Fig. 9
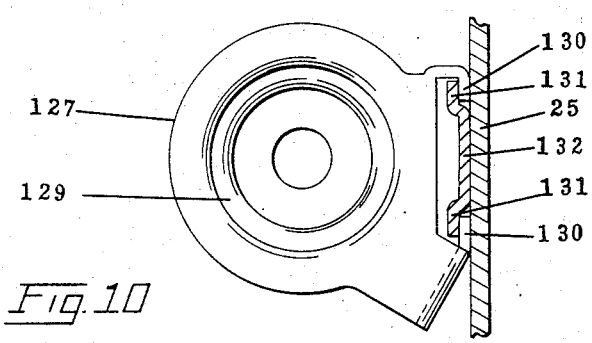
Fig. 10
INVENTOR
Eldon D. Raney
BY
ATTORNEY Dec. 28, 1943.　　　　E. D. RANEY　　　　2,337,926
CONTROL APPARATUS
Filed Oct. 21, 1939　　　4 Sheets-Sheet 4

INVENTOR
Eldon D. Raney
BY
ATTORNEY

Patented Dec. 28, 1943

2,337,926

UNITED STATES PATENT OFFICE 2,337,926

CONTROL APPARATUS

Eldon D. Raney, Columbus, Ohio, assignor to Ranco Incorporated, Columbus, Ohio, a corporation of Ohio Application October 21, 1939, Serial No. 300,611

4 Claims. (Cl. 62—4)

This invention relates to improvements in control apparatus and more particularly to control apparatus for refrigerating systems.

An object of the present invention is to provide a control apparatus having a control member movable between two control positions and being constantly biased toward one of the positions, and having an actuating member for moving the control member to the other of the positions and a thermostatically controlled element for resisting the movement of the control member in the direction of its bias independently of the actuating member.

It is a further object of the invention to provide a control apparatus as described in the preceding paragraph in which the actuating member and the resisting element may move each in one direction without affecting the control member, for permitting the control of the control member to be shifted from the actuating member to the resisting element and vice versa.

Other and further objects and advantages will be apparent from the following description, reference being had to the accompanying drawings wherein a preferred form of embodiment of the present invention is clearly shown.

In the drawings:

Fig. 3 is an end view of the control apparatus;

Fig. 4 is a side view of certain members of the control actuating mechanism and resisting mechanism;

Fig. 5 is an end view of the mechanism shown in Fig. 4;

Fig. 6 is an enlarged fragmentary view partly in section, showing the snap switch and part of the actuating mechanism therefor;

Fig. 7 is an enlarged top view of a toggle switch, part thereof being broken away;

Fig. 8 is a perspective view of a switch lever;

Fig. 9 is a perspective view of a flipper lever;

Fig. 10 is a sectional view taken on line 10—10 of Fig. 1;

Figure 1:
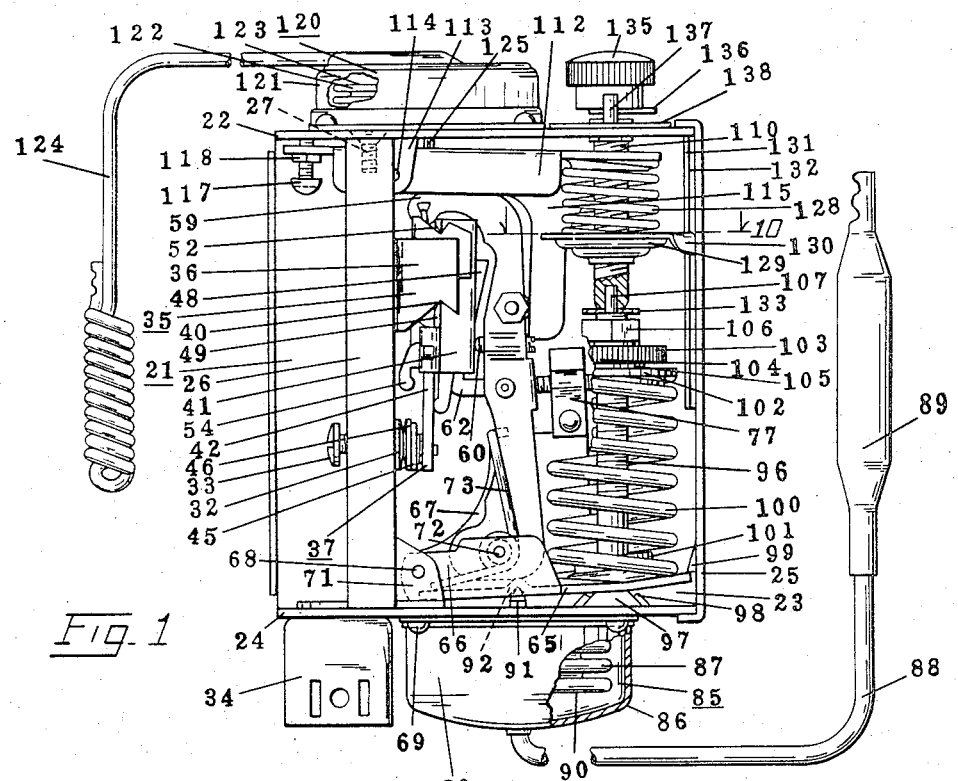
Fig. 1 is a side view of a control apparatus with the casing cover removed, part of the apparatus being shown broken away.
Figure 2:
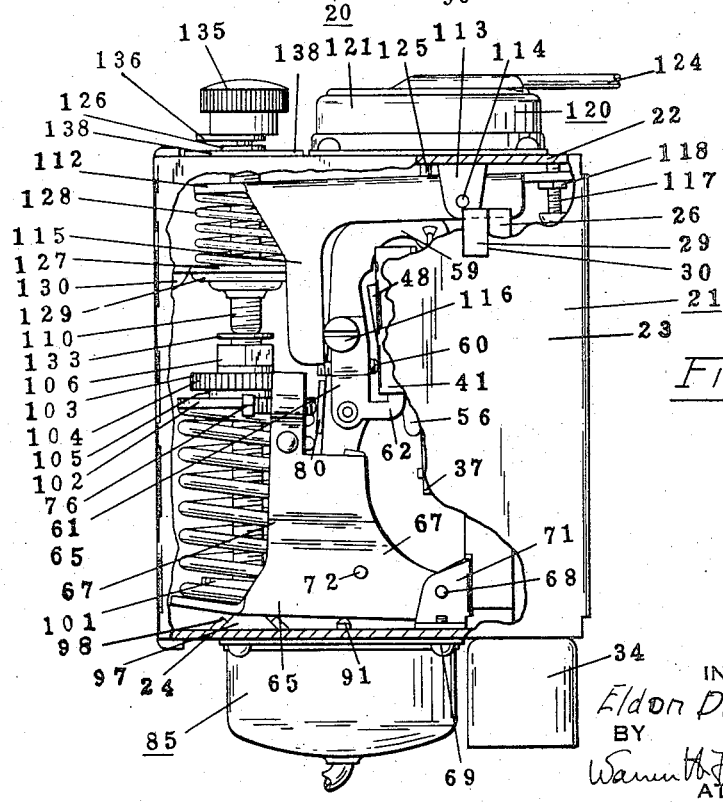
Fig. 2 is a view of the control apparatus taken from the side opposite that shown in Fig. 1, part of the casing being shown broken away.

Referring to the drawings a control apparatus 20 is shown that is adapted to control the operation of an electric refrigerating system. The control apparatus includes a casing 21, formed with a top wall 22, a side wall 23, a bottom wall 24 and an end wall 25. Preferably, the remaining open end and side are closed by a suitable cover, not shown.

A switch base 26, formed of insulating material such as Bakelite, is mounted between the top and bottom walls of the casing. The top end of the base 26 is secured in place by a screw 27 and the lower end of the base is riveted to the yoke of a fixed bracket 71 by rivets 28. The bracket 71 is secured to the bottom wall 24 by screws 69. A lug 29 is formed on the side of the base 26 and fits into an opening 30 formed in the side all 23 to further stabilize the base. A pair of contacts 32 are secured to the base 26 and each contact is connected to a terminal 33 disposed on the opposite side of the base. Line wires for a refrigerator motor circuit may be brought into the casing through a shielded opening indicated at 34.

Figure 12:
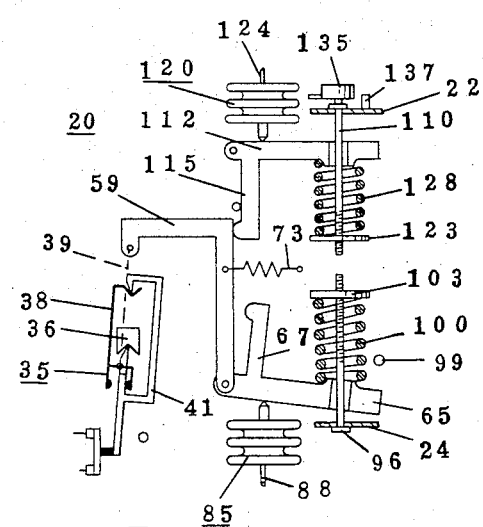
Fig. 12 is a diagrammatic illustration of the control apparatus showing the resisting element operative to maintain the control member in a position intermediate two control positions and the actuating member withdrawn from the control member.
Figure 13:
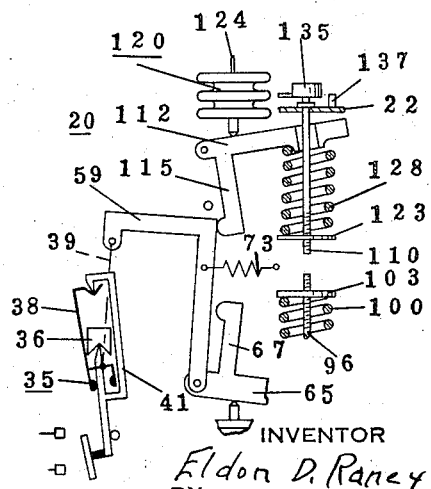
Fig. 13 is a view similar to Fig. 8 but showing the control member in one extreme control position.

A snap switch 35 is mounted on the base 26. The switch comprises a bracket 36, a contact carrying switch lever 37 pivotally supported on the bracket, a flipper lever 38 pivotally supported at one end on one end of the lever 37 and connected at the other end to the lever 37 by a lost motion connection, and a tension spring 39 connecting the flipper lever 38 and a control lever 59. The bracket 36 is U shaped, and the yoke thereof is riveted to the base 26. V notches 40 are formed in the lower edge of the two legs of the bracket for receiving pivot lugs formed on the switch lever 37. The switch lever 37 is formed by a channel shaped member 41 and a fiber member 42 that is joined to the member 41. The member 41 is disposed between the legs of the bracket 36 and is formed with flanges 43 at one end that extend from either side thereof. The fiber member 42 is U shaped and ears 44 formed on the flanges 43 are folded over the edges of the legs of member 42 and firmly secure the fiber member to the member 41. A contact bar 45 is attached to the end of the fiber member. Contacts 46 are riveted on either end of the bar 45 and are adapted to engage the fixed contacts 32. Edges of the flanges 43 form shoulders 47 which engage in the vertex of the notches 40 to form pivots for the switch lever 37. The edges of the shoulders 47 are beveled to form knife edge bearings. The yoke of the channel shaped member 41 is formed with a conical section 48 at one end to allow space for the tension spring 39. A shoulder 49 is formed on each side of the member 41 at the upper end thereof and edges of these shoulders serve as pivots for the flipper lever 38. The edges of the shoulders 49 are beveled to present knife edge bearing points. The flipper lever 38 is formed of a flat strip having a pair of flanges 51 formed at one end and one on either side thereof. These flanges are spaced to fit between the outer walls of the channel shaped member 41 and the legs of the bracket 36. V notches 52 are formed in one edge of each flange 51 and receive the edges of the bearing shoulder 49. A flange 53 is formed at the opposite end of the strip and a fiber fork member 54 is riveted thereto. The fork member 54 is formed with two fingers 55 and 56 that straddle the yoke of the fiber member 42. The spring 39 is connected at one end in an eyelet 57 formed in the flange 53 and the other end is connected in an eyelet 58 formed in the control lever 59. The spring 39 biases the flipper lever 38 against the shoulders 49 and also biases the shoulders 47 of the lever 37 in the notches 40. When the control lever 59 is moved to the left, as viewed in Fig. 11, the center of the spring 39 (represented in Figs. 11, 12 and 13 by a dotted line) is moved to the left of the pivot for the flipper lever 38. This snaps the flipper clockwise about its pivot causing the finger 56 to engage the switch lever 37 and rotate the switch lever to close the switch contacts. The switch closing movement of the switch lever moves the pivot of the flipper 38 well to the right of the center of the spring 39. When the control lever 59 moves the spring 39 to the right of the flipper lever pivot, the flipper is rotated counterclockwise about its pivot and the finger 55 strikes the lever 37 to separate the switch contacts. The switch opening movement of the lever 37 is limited by a screw 60 secured on the lever 59 by a bracket 61 attached to the lever. The lever and bracket are formed with complementary cylindrical sections in which the screw 60 is threaded. A hooked arm 62, formed integral with the bracket 61 extends inside the yoke of the member 41. The arm 62 is adapted to engage the yoke of the member 41 to forcefully open the switch should the contacts stick for any reason and prevent the snap mechanism from opening the switch. It is apparent that to open and close the switch, the control lever 59 must be moved between two extreme positions at which positions the switch is opened and closed with a snap movement. The control lever 59 is pivotally mounted on an actuating lever 65. The lever 65 is pivotally supported by a pin 68 journaled between uprights 70 of the bracket 71 and is formed with an upturned flange 66 on one side thereof and an upwardly extending arm 67 on the opposite side. The control lever 59 is supported on a pin 72 journaled at either end in the flange 66 and the arm 67. A coiled spring 73 is disposed around the pin 72, one end thereof engaging the control lever 59 and the other end the actuating lever 65. This spring continuously biases the control lever 59 in the switch opening direction.

The arm 67 of the actuating lever has an extending finger 75 that supports a screw 76. The screw 76 is secured to the finger 75 by a clip 77 riveted to the finger. The finger and clip are each formed with complementary cylindrical sections into which the screw 76 is threaded. The end of the screw 76 is adapted to engage a lug 80 formed on the control lever 59 when the actuating lever is moved in the switch closing position by the arm 67, but the arm 67 may be separated from the lever 59 during movement of the actuating lever 65 in the switch opening direction.

The actuating lever 65 is moved in the switch closing direction by a thermostatic device 85. The thermostatic device 85 comprises a cup-like casing 86, a bellows 87 and a tube 88 connected to the shell, the tube being provided with a bulb 89 at the end thereof. One end of the bellows is closed as at 90 and the edges of the opposite end are hermetically joined with the walls of the shell. The bellows thus forms a flexible wall for the shell. The enclosed portion of the shell, tube and bulb are filled with a suitable temperature responsive fluid, such as for example, methyl chloride vapor, the pressure of which varies as the temperature varies. A pin 91 is connected to the end wall 90 of the bellows and the end thereof abuts a detent 92, formed in the actuating lever.

A threaded stud 96 extends through the bottom wall of the casing 21 and through an opening in the end of the actuating lever 65. The stud has a tapered, squared head 97, two sides of which engage portions 98 of the bottom wall and are turned upwardly to form the opening for the stud. The portions 98 assist in preventing the head from being drawn through the bottom wall. The flat surfaces of the head 97 engaging the portions 98 prevent rotation of the stud. A compression spring 100 is disposed around the stud and the lower end thereof engages the actuating lever 65. A boss 101, formed on the lever 65 centers the spring. A washer 102 forming a downwardly extending boss for centering the top of the spring 100 is disposed on the stud. The position of the washer 102 on the stud may be adjusted by an adjusting nut 103, threaded on the stud. The nut 103 is formed with a knurled flange 104 and a shoulder 105 that engages the washer 102. The nut 103 is locked in position by a lock nut 106. The upper end of the stud 96 is provided with a shank 107 that is journaled in an opening formed in a stud 110, described hereinbelow.

The thermostatic device and spring 100 coact to rotate the actuating lever 65 about its pivot. When the pressure within the casing 86 increases, due to an increase in temperature of the fluid in the bulb 89, the bellows rotates the actuating lever counterclockwise as viewed in Fig. 1. A stop in the form of an ear 99 struck from the wall 25, limits counterclockwise rotation of the actuating lever. When the pressure in the casing 86 decreases due to a decrease in temperature of the fluid, in the bulb 89, the spring 100 may move the actuating lever clockwise as the pin 91 descends.

A channel shaped lever 112 is pivoted between two spaced ears 113, struck downwardly from the top wall of the casing 21, by a pin 114. A depending arm 115 is formed on the lever 112 that is adapted to be engageable with, but unattached to, a laterally extending lug 116 secured to the control lever 59. A screw 117 is threaded in one end of the lever 112 and abuts the top wall 22 to provide a stop for the lever 112 when the lever is rotated clockwise, as viewed in Fig. 1. A lock nut 118 is provided on the screw 117 to lock the latter in position. The lever 112 is adapted to be rotated clockwise by a thermostatic device 120 that is similar to the device 85. The device 120 comprises a casing 121, housing a bellows 122 that has the edges of one end hermetically joined with the walls of the casing and a closing end 123. A tube 124 is connected with the casing. The tube and casing contain a temperature responsive fluid such as methyl chloride vapor. The end of the tube 124 is closed and coiled to form a condenser. The bellows 122 is connected to the lever 112 by a pin 125 that is attached to the end wall 123 of the bellows.

The stud 110 extends downwardly through an opening in the top wall 22 into the casing 21. A shoulder 126 formed on the end of the stud 110 supports the stud on wall 22. A washer 127 is threaded on the stud 110 having a depression 129 formed therein for seating a compression spring 128, which compression spring 128 is disposed around the stud between the washer 127 and the end of the lever 112. A boss 134 is formed on the lever 112 for centering the spring. A pair of ears 130 are formed on the washer 127, which ears are disposed between the end wall 25 and flanges 131 formed on a T shaped strip 132 secured to the end wall 25. The ears cooperating with the wall 25 and the flange 131 prevent rotation of the washer and stabilizes the studs 96 and 110. A washer 133 is disposed on the shank 107 between the studs to limit downward movement of washer 127.

An adjusting knob 135 is secured on the end of the stud 110 which knob is provided with a pointer 136. A pin 137 secured on the top wall in the path of the pointer 133 limits rotation of the knob 135. An indicia plate 138 is attached to the top wall 22 and cooperates with the pointer 136 to indicate the temperatures at which the switch 35 is opened.

Figure 11:
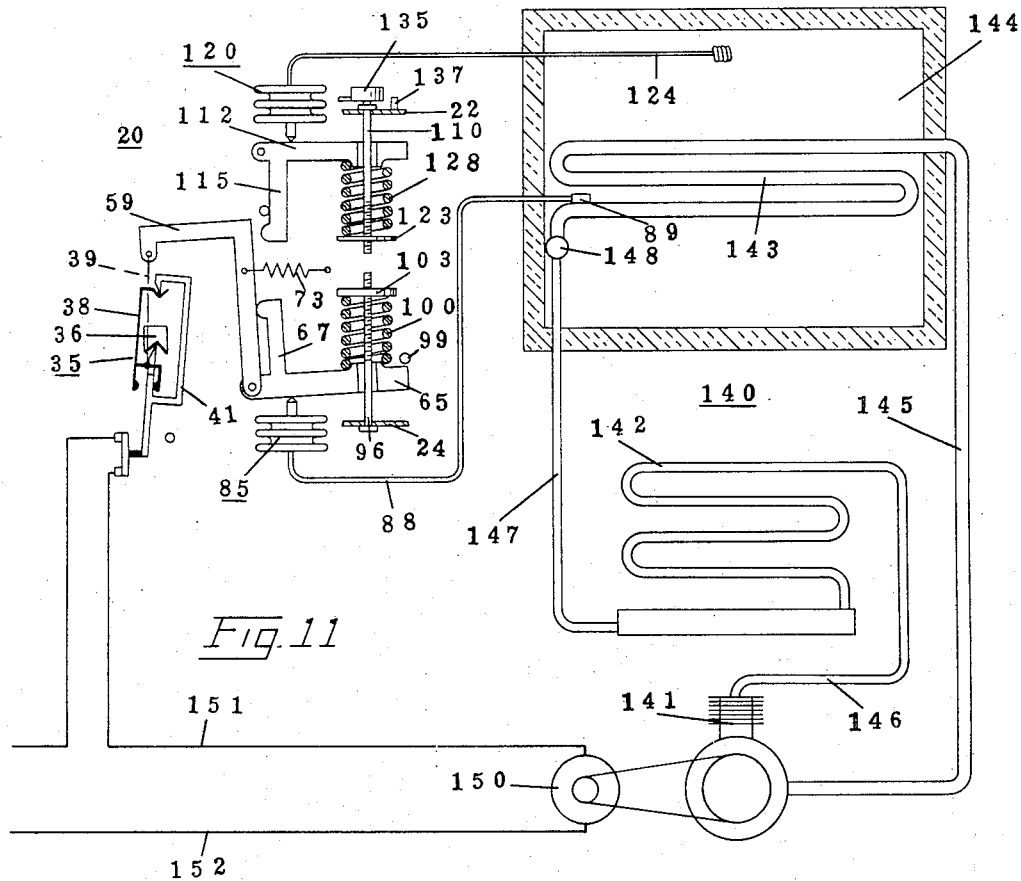
Fig. 11 is a diagrammatic illustration of a control apparatus and a refrigerating system controlled by the apparatus.

The control apparatus 20 is particularly useful in controlling air temperatures of a refrigerator cabinet. Referring to Fig. 11 the control apparatus 20 is shown controlling a refrigerating system 140.

The refrigerating system is a compressor-condenser-expander type and includes a compressor 141, condenser receiver 142 and an evaporator 143, all suitably connected in a closed circuit as is well understood in the art. The evaporator 143 is mounted in a refrigerator cabinet 144 and when the compressor is operating gaseous refrigerant is withdrawn from the evaporator through tube 145, compressed by the compressor, and directed through tube 146 into the condenser 142 where liquid refrigerant collects. The liquid refrigerant is then directed through a tube 147 to an expansion valve 148 and into the evaporator 143. The liquid refrigerant entering the evaporator 143 expands and absorbs heat as is well understood in the art. An electric motor 150 drives the compressor. The circuit for the motor includes line wires 151 and 152 and the switch 35 of the control apparatus 20 is connected in the line 151 to control the operation of the motor. The bulb 89 is placed in direct heat transfer relation with the evaporator 143 and the coiled end of the tube 124 is placed in the air space of the cabinet 144. The refrigerating system illustrated may be for storing meats and the like in which it is desirable to maintain the air temperature at 38 deg. F. and to defrost the evaporator on each cycle of operation of the system.

Preferably the spring 100 and the stop screw 60 are adjusted so that when the temperature of the bulb reaches 34 deg. F. for example, the pressure on the bellows 85 will cause the actuating lever 65 to move the control lever 59 to the switch closing position, and when the temperature of the bulb is reduced to 28 deg. F. for example, the spring 100 will overcome the pressure in the thermostatic device to move the actuating lever 65 to a position at which the control lever 59 will open the switch 35. It is to be understood that the control lever 59 is biased toward the switch opening position by the spring 73 at all times. Thus, if the lever 112 is not moved into the path of the control lever 59, the switch 35 will open when the temperature of the bulb 89 drops to 28 deg. F. The tension of the spring 128 is adjusted so that when the temperature of the coiled end of the tube 124 is above 38 deg. F., the pressure within the thermostatic device 120 will cause the lever 112 to be rotated clockwise to a position to prevent the control lever 59 from moving to the switch opening position. As the temperature of the coil falls toward 38 deg. F., the temperature desired to be maintained in the cabinet, the spring 128 will move the lever 112 counterclockwise, due to the decreasing vapor pressure in the thermostatic device 120 and the control lever 59 will follow the arm 115 of the lever. When the temperature of the air in the cabinet is reduced to 38 deg. F., the lever 112 will be moved to the position at which the lever 59 will open the switch. The elements will then be in the position shown in Fig. 13. It is to be noted, however, from the position of the elements shown in Fig. 12 that if the temperature of the air has not been reduced to the desired minimum, the arm 115 is not retracted and, as shown by this figure, reduction of temperature in the evaporator below 28 deg. F. will have no effect to open the switch, because, under such condition, lever 59 will engage arm 115 and will be stopped thereby, while lever 65 will continue to rotate clockwise.

Thus, although the temperature of the evaporator is reduced to below 28 deg. F. the cooling operation of the refrigerator will continue until the air has been reduced to the desired minimum temperature, i. e. operation of the compressor will be stopped only after the evaporator and the air has been reduced to the desired minimum temperature. Since the arm 115 is limited in its clockwise movement and cannot move lever 59 far enough to close the switch, and since arm 67 is the only element for moving lever 59 far enough to close the switch, the cooling operation will be started only after the bellows 85 has expanded sufficiently to actuate the lever 59 to its switch closing position. Since the cooling operation is started solely in response to the temperature of the evaporator, and since the temperature at which the starting can be adjusted, by controlling the tention of spring 100, the switch can be adjusted so that it will not be closed until the temperature of the evaporator has been increased above the ice and frost melting temperature. In this manner the evaporator is cyclically defrosted.

It is to be noted that the stop screw 117 is adjusted so that the lever 112 cannot move the control lever 59 to the switch closing position if the cabinet 144 should warm above 38 deg. F. before the switch is closed by the actuating lever 65. It is to be understood, however, that the stop may be adjusted so that either of the levers 112 or 65 could move the control lever 59 to the switch closed position.

While the form of embodiment of the present invention as herein disclosed constitutes a preferred form, it is to be understood that other forms might be adopted, all coming within the scope of the claims which follow.

I claim:

1. In combination with a refrigerating system including an enclosure, an evaporator in the enclosure for affecting the temperature of a medium therein and means for circulating refrigerant through the evaporator; a control mechanism for said means including a member for starting the circulating means when said member is moved to one position and for stopping the circulating means when said member is moved to a second position; a spring constantly biasing the member toward said second position; a thermostatic device for moving said member to the first mentioned position, said device being ineffective for urging said member to said second position and being operable according to changes in temperature of the evaporator for operating said member; and a thermostatic device having a part thereof movable gradually according to gradual changes in temperature of said medium, said part being movable gradually into the path of movement of the movable member toward said second position for yieldingly resisting movement of the member to said second position.

2. In combination with a refrigerating system including an enclosure, an evaporator in the enclosure for affecting the temperature of a medium therein and means for circulating refrigerant through the evaporator; a control mechanism for said means including a movable member for starting the circulating means through the evaporator when said member is moved to one position and for stopping the circulating means when said member is moved to a second position; a spring constantly biasing the member toward said second position; a thermostatic device operable according to changes in temperature of the evaporator for moving said member to the first mentioned position, said device being ineffective for urging said member to said second position; a thermostatic device having a part thereof movable gradually in accordance with gradual changes in temperature of said medium, said part being movable gradually into the path of movement of the movable member for yieldingly resisting movement of the member to the second mentioned position, the second mentioned thermostatic device being operable according to changes in temperature of said medium; and means forming a stop for preventing movement of said member by the last mentioned thermostatic device to the first mentioned position.

3. In a control apparatus, a control member movable between two extreme control positions; means for constantly biasing the control member toward one of the control positions; thermostatically controlled actuating means for moving the control member to the other of said control positions, said thermostatically controlled actuating means being ineffective for urging the control member to said one control position; an element independent of the thermostatically controlled actuating means for yieldingly resisting movement of the control member, by the first mentioned means, toward the said one position; thermostatic means for varying the yielding effect of said element; and means forming a stop for preventing movement of the control member by the element to said other control position.

4. In a control apparatus, a control member movable between two extreme control positions; means for constantly biasing the control member toward one of the control positions; thermostatically controlled actuating means for moving the control member to the other of said control positions, said thermostatically controlled actuating means being ineffective for urging the control member to said one control position; an element independent of the thermostatically controlled actuating means for yieldingly resisting movement of the control member, by the first mentioned means, toward the said one position; thermostatic means for varying the yielding effect of said element; and means forming an adjustable stop for adjusting the degree of movement of the control member by the element in the direction of said other control position.

ELDON D. RANEY